Nov. 16, 1937.                H. KLEIN                    2,099,524
                 STARTER FOR INTERNAL COMBUSTION ENGINES
                         Filed April 18, 1935
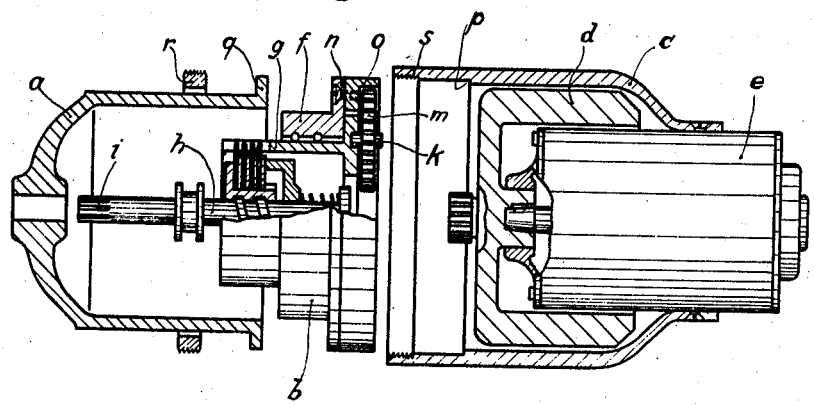
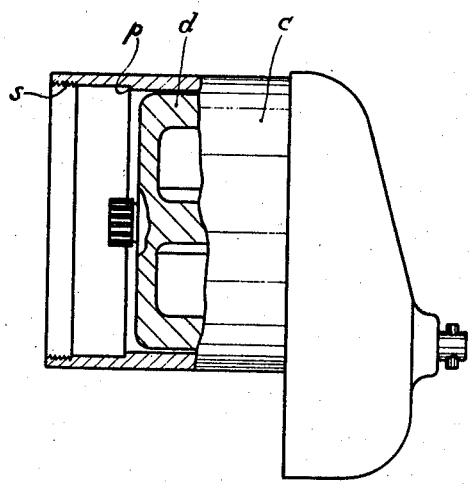

Patented Nov. 16, 1937

2,099,524

UNITED STATES PATENT OFFICE 2,099,524

STARTER FOR INTERNAL COMBUSTIO ENGINES

Hermann Klein, Stuttgart-Feuerbach, Germa assignor to Robert Bosch Aktiengesellsch Stuttgart, Germany Application April 18, 1935, Serial No. 17,115 In Germany May 7, 1934

7 Claims. (Cl. 123—179)

The present invention relates to inertia mass starters for internal combustion engines, in which the inertia mass set in rotation by a driving mechanism operates through a transmission gearing and a clutch on a driving member which can be brought into engagement with a part of the internal combustion engine.

In a known inertia mass starter, the inertia mass and the transmission gearing between the inertia mass and the driving member itself are each arranged in a separate casing member, whereby the assembling and also the dismantling of the starter are rendered more difficult. The object of the invention is to obtain a compact and cheap construction of the starter, and one which can be easily taken to pieces. This is obtained according to the invention by the transmission gear being combined with the clutch and the driving member as a constructional unit in a bearing bracket, and inserted in a casing enclosing the inertia mass and preferably also its driving mechanism, and together with the bearing bracket being secured together.

Two examples of construction of the invention are shown in the accompanying drawing, in which:—

Figure 1 shows a starter, with its parts separated.

Figure 2 shows a second form of construction.

The inertia mass starter consists essentially of three parts constructed as units, namely the bearing bracket $a$, the clutch gear $b$, and the starter casing $c$ in which are arranged the inertia mass $d$ and a driving motor $e$ on whose shaft the inertia mass is secured. The clutch gear consists of a bearing ring $f$, in which the outer part $g$ of a plate-clutch is revolubly mounted. The inner part of the clutch is mounted on a shaft $h$ longitudinally slidable in the clutch, and the end of which is formed as a pinion $i$. On the part $g$ of the clutch, are fastened pins $k$, on which the internal wheels $m$ of a planet-gear are mounted. The bearing ring $f$ has a flange $n$, to which is secured an internally toothed wheel $o$ on which the wheels $m$ can roll. The clutch gear with the pinion shaft and the planet-gear form a constructional unit which can be inserted into the starter casing $c$. The casing has in its interior a stop $p$, against which the toothed wheel $o$ bears when the starter is assembled. The bearing bracket $a$ can be snugly fitted on the bearing ring $f$. The bearing bracket has a flange $q$, the external diameter of which is equal to that of the flange on the ring $f$. The bearing bracket and the clutch gear are secured together by a ring nut $r$, that can be screwed into a thread $s$ on the starter casing $c$.

Figure 2 shows the casing of the inertia mass of a starter having a manual drive situated eccentrically to the inertia mass and the clutch gear. This construction has the great advantage that the casing of the inertia mass can be suitably rotated relative to the bearing bracket $a$, in order to obtain any desired position of the manual drive.

In general, the construction has the advantage that the starter can be easily taken to pieces in order to change any damaged parts.

In order to obtain a cheap, compact, and, what is important for vehicles, light construction, the casing of the inertia mass is preferably drawn from sheet metal.

I declare that what I claim is:

1. A starter for internal combustion engines comprising in combination driving means, an inertia mass driven by said driving means, a casing enclosing said inertia mass, said driving means and inertia mass being mounted together and supported by said casing to form therewith a constructional unit, a transmission gear and clutch and a driving member for engagement with a part of the engine, and means mounting said transmission gear, clutch and driving member together as a constructional unit adapted to be inserted and withdrawn as a whole into and from said casing and a bearing bracket for said driving member secured to said casing and adapted to be connected thereto to detachably connect said units together.

2. A starter for internal-combustion engines comprising in combination driving means, an inertia mass driven by said driving means, a casing enclosing said inertia mass, said driving means and inertia mass being mounted together and supported by said casing to form therewith a constructional unit, a transmission gear and clutch and a driving member for engagement with a part of the engine, a bearing bracket for said driving member secured to said casing, and means mounting said transmission gear, clutch and driving member together as a constructional unit adapted to be inserted and withdrawn as a whole into and from said casing and to be secured between a stop provided on the interior of said casing and said bearing bracket to detachably connect said units together.

3. A starter for internal combustion engines comprising in combination driving means, an inertia mass driven by said driving means, a casing enclosing said inertia mass, said driving means and inertia mass being mounted together and supported by said casing to form therewith a constructional unit, a transmission gear, clutch and driving member adapted for engagement with a part of the engine, a flanged bearing ring adapted to engage in said casing, said transmission gear, clutch and driving member being revolubly mounted in said bearing ring to form a constructional unit adapted to be connected to said casing to detachably connect said units together, and a bearing bracket for said driving member adapted to be secured to the casing and to abut against the flange of said bearing ring.

4. A starter for internal combustion engines comprising in combination driving means, an inertia mass driven by said driving means, a casing enclosing said inertia mass, said driving means and inertia mass being mounted together and supported by said casing to form therewith a constructional unit, a transmission gear, clutch and driving member adapted for engagement with a part of the engine, a flanged bearing ring adapted to engage in said casing, said transmission gear, clutch and driving member being revolubly mounted in said bearing ring to form a constructional unit and a bearing bracket for said driving member adapted to enter said casing and to abut against the flange of said bearing ring and a ring nut encircling said bearing bracket adapted to be screwed into the casing for securing the bearing bracket and bearing ring together with said transmission gear, clutch and driving member to the casing whereby said units are detachably connected together.

5. A starter for internal combustion engines comprising in combination driving means, an inertia mass driven by said driving means, a casing formed of drawn steel enclosing said inertia mass, said driving means and inertia mass being mounted together and supported by said casing to form therewith a constructional unit, a transmission gear, clutch and driving member adapted for engagement with a part of the engine, a flanged bearing ring adapted to engage in said casing, said transmission gear, clutch and driving member being revolubly mounted in said bearing ring to form a constructional unit and a bearing bracket for said driving member adapted to be secured to the casing and to abut against the flange of said bearing ring to detachably connect said units together.

6. A starter for internal combustion engines comprising in combination, driving means, an inertia mass driven by said driving means, and a casing enclosing said inertia mass and driving means, said driving means and inertia mass being mounted together and supported by said casing to form therewith a constructional unit, a transmission gear and clutch and a driving member for engagement with a part of the engine, said transmission gear, clutch and driving member being mounted together to form a second constructional unit, a bearing bracket detachably mounting said second constructional unit, and means for detachably securing said bracket in said casing whereby said units are detachably and operatively connected together, said bracket and casing forming between them a housing for enclosing and supporting said second constructional unit.

7. A starter for internal combustion engines comprising in combination driving means, an inertia mass driven by said driving means, a casing enclosing said inertia mass, said inertia mass and driving means being supported by said casing to form therewith a constructional unit, a transmission gear and clutch and a driven member for engagement with a part of the engine, a ring member supporting and holding said transmission gear, clutch and driven member together to form a constructional unit adapted to be inserted and withdrawn as a whole into and from said casing, a clamping member adapted to detachably hold said second unit in said casing, and a bearing bracket for said driven member secured in said casing by said clamping member.

HERMANN KLEIN.